US008902883B1

(12) United States Patent
Sayrafian-Pour (10) Patent No.: US 8,902,883 B1
(45) Date of Patent: Dec. 2, 2014

(54) METHOD AND APPARATUS FOR PRIORITY-PROVISIONED ARBITRATION SCHEDULING FOR A SWITCH FABRIC

(71) Applicant: Altera Corporation, San Jose, CA (US)

(72) Inventor: Kamran Sayrafian-Pour, Silver Spring, MD (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 13/902,688

(22) Filed: May 24, 2013

Related U.S. Application Data (62) Division of application No. 12/623,126, filed on Nov. 20, 2009, now Pat. No. 8,451,854, which is a division of application No. 10/952,099, filed on Sep. 29, 2004, now Pat. No. 7,643,493.

(51) Int. Cl.
*H04L 12/50* (2006.01)
*H04L 12/937* (2013.01)

(52) U.S. Cl.
CPC .................................. *H04L 49/254* (2013.01)
USPC ........... 370/359; 370/386; 370/462; 370/422; 370/395.4; 370/389; 370/401

(58) Field of Classification Search
None
See application file for complete search history.

(56) References Cited

U.S. PATENT DOCUMENTS

| | | | |
|---|---|---|---|
| 5,500,858 A | 3/1996 | McKeown | |
| 5,796,966 A | 8/1998 | Simcoe et al. | |
| 6,445,706 B1 * | 9/2002 | Fransson et al. | 370/395.42 |
| 6,570,873 B1 | 5/2003 | Isoyama et al. | |
| 6,661,788 B2 | 12/2003 | Angle et al. | |
| 6,757,246 B2 | 6/2004 | Alasti et al. | |
| 6,990,072 B2 | 1/2006 | Alasti et al. | |
| 7,190,674 B2 | 3/2007 | Kobayakawa et al. | |
| 7,203,202 B2 | 4/2007 | Chao et al. | |
| 7,274,701 B2 | 9/2007 | Boduch et al. | |
| 7,292,594 B2 | 11/2007 | Meempat et al. | |
| 7,424,027 B2 | 9/2008 | Sonnier | |
| 7,426,184 B2 | 9/2008 | Vaananen | |
| 7,539,199 B2 | 5/2009 | Shrimali et al. | |
| 2003/0035427 A1 * | 2/2003 | Alasti et al. | 370/395.4 |
| 2003/0072326 A1 | 4/2003 | Alasti et al. | |
| 2004/0213266 A1 | 10/2004 | Willhite et al. | |

* cited by examiner

*Primary Examiner* — Kibrom T Hailu
(74) *Attorney, Agent, or Firm* — Womble, Carlyle, Sandridge & Rice (57) ABSTRACT

An apparatus and method for scheduling within a switch is described. A set of input signals is received from input ports. The set of input signals is associated with a set of packets at the input ports. A request for each packet from the set of packets is generated based on the set of input signals. Each request has an input-port indicator, an output-port indicator and a service-level indicator. The packets are scheduled based on the service-level indicator.

18 Claims, 6 Drawing Sheets

METHOD AND APPARATUS FOR PRIORITY-PROVISIONED ARBITRATION SCHEDULING FOR A SWITCH FABRIC

CROSS REFERENCE TO RELATED APPLICATIONS

This application is a divisional application of U.S. patent application Ser. No. 12/623,126 filed Nov. 20, 2009, which is a divisional of U.S. patent application Ser. No. 10/952,099 filed on Sep. 29, 2004, now U.S. Pat. No. 7,643,493. The disclosure of this related application is incorporated herein by reference for all purposes.

BACKGROUND

The invention relates generally to telecommunication switches. More specifically, the invention relates to priority-provisioned arbitration scheduling for a switch fabric (e.g., a switch fabric with an input-buffered switch architecture).

Known switch fabrics with crossbar architectures exist where data cells received on the multiple input ports of the switch are sent to the various output ports of the switch. Scheduling techniques ensure that the data cells received from different input ports are not sent to the same output port at the same time. These techniques determine the temporary connections between input ports and output ports, via the switch fabric, for a given time slot.

Scheduling techniques can be evaluated based on a number of performance requirements to a broad range of applications. Such performance requirements can include, for example, operating at a high speed, providing a high throughput (i.e., forwarding as many data packets as possible for each time slot), guaranteeing quality of service (QoS) for specific users, and being easily implemented in hardware. Known scheduling techniques trade one or more performance areas for other performance areas.

For example, U.S. Pat. No. 5,500,858 to McKeown discloses one known scheduling technique for an input-queued switch. This known scheduling technique uses rotating priority iterative matching to schedule forwarding of data across the crossbar of the switch fabric. When the data cells are received at the input ports in a uniform manner (i.e., in a uniform traffic pattern per port), this known scheduler can produce 100 throughput of data cells across the switch fabric. When the data cells are received at the input ports, however, in a non-uniform manner, more typical of actual data traffic, the throughput from this known scheduling technique substantially decreases.

Thus, a need exists to provide a scheduling technique that can perform effectively for various traffic patterns and multiple performance requirements, such as for example, operating at a high speed, providing a high throughput, guaranteeing QoS, and being easily implemented in hardware.

SUMMARY OF THE INVENTION

An apparatus and method for scheduling within a switch is described. A set of input signals is received from input ports. The set of input signals is associated with a set of packets at the input ports. A request for each packet from the set of packets is generated based on the set of input signals. Each request has an input-port indicator, an output-port indicator and a service-level indicator. The packets are scheduled based on the service-level indicator.

BRIEF DESCRIPTION OF THE DRAWINGS

The invention is described with reference to the accompanying drawings. In the drawings, like reference numbers indicate identical or functionally similar elements.

DETAILED DESCRIPTION

An apparatus and method for scheduling within a switch is described. A set of input signals is received from input ports. The set of input signals is associated with a set of packets at the input ports. A request for each packet from the set of packets is generated based on the set of input signals. Each request has an input-port indicator, an output-port indicator and a service-level indicator. The packets are scheduled based on the service-level indicator.

A "service-level indicator" is any type of tag, or field associated with a request that conveys priority-based, quality-of-service (QOS) information. The value of this service-level indicator can be, for example, based on input signals provided from the input ports (where the packets are buffered) to a scheduler having a request generator. The value of a service-level indicator is related to the priority level of the respective packets. Such input signals can be, for example, associated with each head-of-line buffered packet. The request generator can then generate a request, including the service-level indicator, for each head-of-line packet buffered at the input ports.

After the request generator has generated requests, scheduling can be performed based on priority levels of the packets as represented by the service-level indicators and associated credit-weight values. The "credit-weight value" represents the accumulation of credits for a given buffered packet while it is waiting to be scheduled. For example, the credit-weight value for a given packet can be increased by the value of the service-level indicator each time slot for which the packet is not scheduled. Thus, when two packets are contending for the same output port, the packet with a higher credit-weight value is more likely to be scheduled before the packet with a lower credit-weight value. Consequently, the higher the priority level for a given packet, the quicker the credit-weight value for that packet increases and the quicker that packet will be scheduled.

The service-level indicator can be associated with each request, for example, on a per-packet basis, a per-crossbar-link basis or a fixed basis. In other words, priority levels can be assigned to packets corresponding to a particular provisioning strategy. Thus, embodiments of the switch described herein can be configured according to a particular provisioning strategy, or can be configurable between multiple provisioning strategies. In this later case, some embodiments can be, for example, configurable so that for one time period, service-level indicators can be associated with each request on a per-packet basis; for another time period, service-level indicators can be associated with each request on a per-crossbar-link basis; and for another time period, service-level indicators can be associated with each request on a fixed basis. For such embodiments, a scheduling indicator can be received to select from one of the possible configurations. Alternatively, some embodiments can be, for example, configurable between two above-described provisioning strategies.

When the service-level indicators are assigned on a per-packet basis, for example, the crossbar will be configured on a priority basis and the crossbar scheduler functions as a priority-based arbiter. As a consequence, packets traversing the same crossbar link can be associated with different priority levels. In addition, the service weight values can change each time slot (corresponding to scheduled packets being sent across the crossbar) based on the changing values of the service-level indicators. As a result of the weight values changing each time slot, the weight values for the head-of-line buffered packets (herein collectively referred to as "service weight matrix") can be updated each time slot.

When the service-level indicators are assigned on a per-crossbar-link basis, for another example, the crossbar will be configured on a reserve-rate basis. In other words, when the service-level indicators each are assigned based on the destination of the corresponding packet, the packets traversing the same crossbar link will have the same service level. In this configuration, the crossbar scheduler functions as a rate-based arbiter similar to that described in pending application U.S. Ser. No. 09/928,509, Publication No. US 20093/0072326 A1, entitled "Method and Apparatus for Parallel, Weighted Arbitration Scheduling for a Switch Fabric," filed Aug. 14, 2002; the disclosure of which is incorporated herein by reference.

When the service-level indicators are assigned on a fixed basis, for yet another example, the crossbar will be configured on an equal opportunity/fairness basis. In this configuration, the scheduler functions as an arbiter suitable for handling uniform traffic pattern.

The term "link" refers to, for example, a potential path across a crossbar within the switch fabric between an input port and an output port. In other words, a given input port can potentially be connected to any of many output ports within the crossbar. For a given time slot, however, a given input port will typically be connected to at most only one output port via a link. For a different time slot, that given input port can be connected to at most one output port via a different link. Thus, the crossbar can have many links (i.e., potential paths) for any given input port and for any given output port, although for a given time slot, only certain of those links will be activated as decided by the scheduler.

Figure 1:
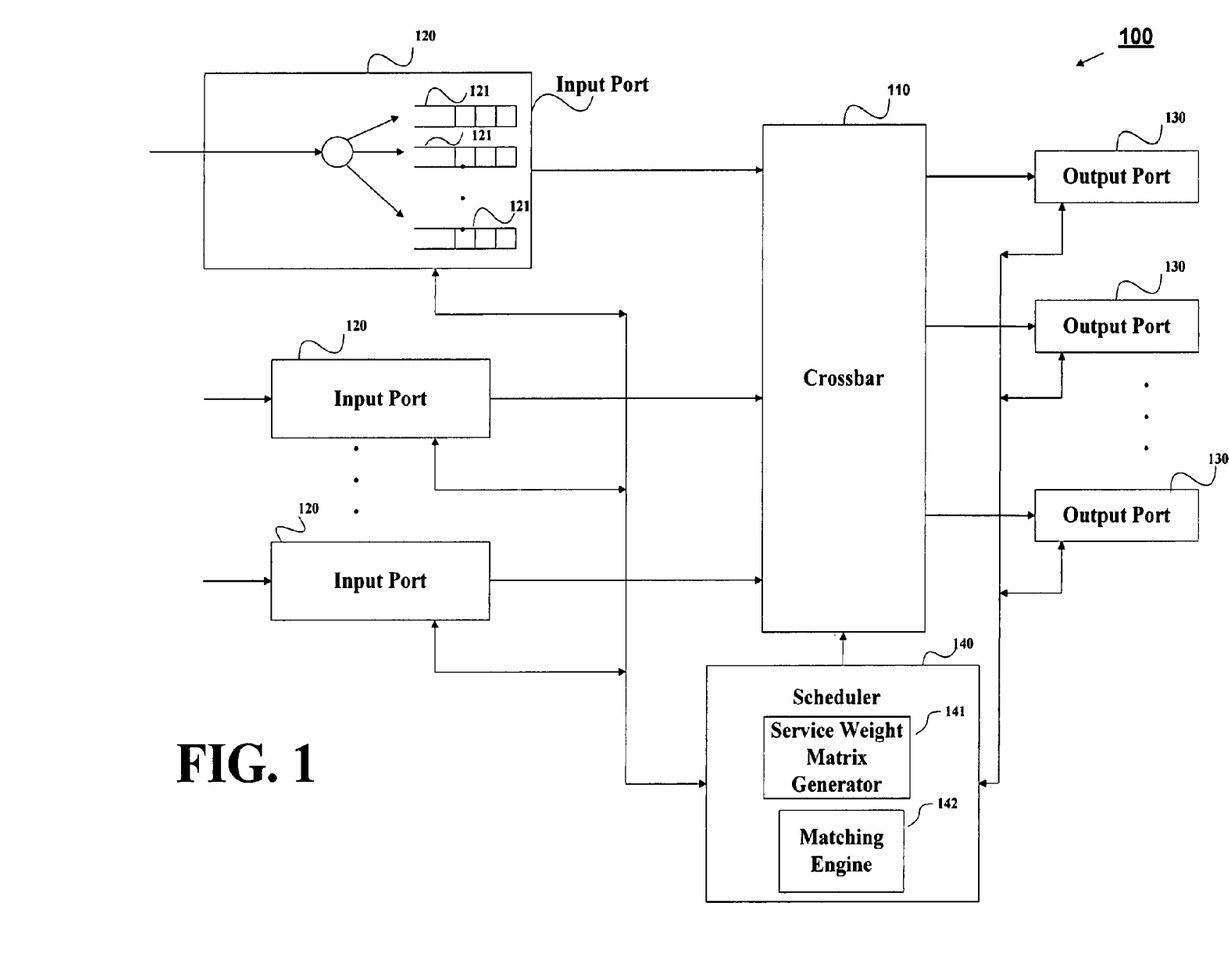
FIG. 1 illustrates a system block diagram of a switch fabric, according to an embodiment of the invention.

FIG. 1 illustrates a system block diagram of a switch fabric, according to an embodiment of the invention. Switch fabric 100 includes crossbar 110, input ports 120, output ports 130 and scheduler 140. Crossbar 110 is connected to input ports 120 and output ports 130. Scheduler 140 is coupled to crossbar 110, input ports 120 and/or output ports 130. More specifically, in switch fabric embodiments that are input-port buffered, scheduler 140 is typically coupled to input ports 120; in switch fabric embodiments that are output-port buffered, scheduler 140 is typically coupled to output ports 130. Scheduler 140 includes a service weight matrix generator 141 and matching engine 142.

As shown for the top-most input port 120 of FIG. 1, each input port 120 has a set of queues 121 into which packets received at the input port are buffered. In this embodiment, each input port can have multiple queues for each destination output port where each queue is associated with a priority level. This embodiment is described in further detail below in reference to FIG. 2.

Figure 2:
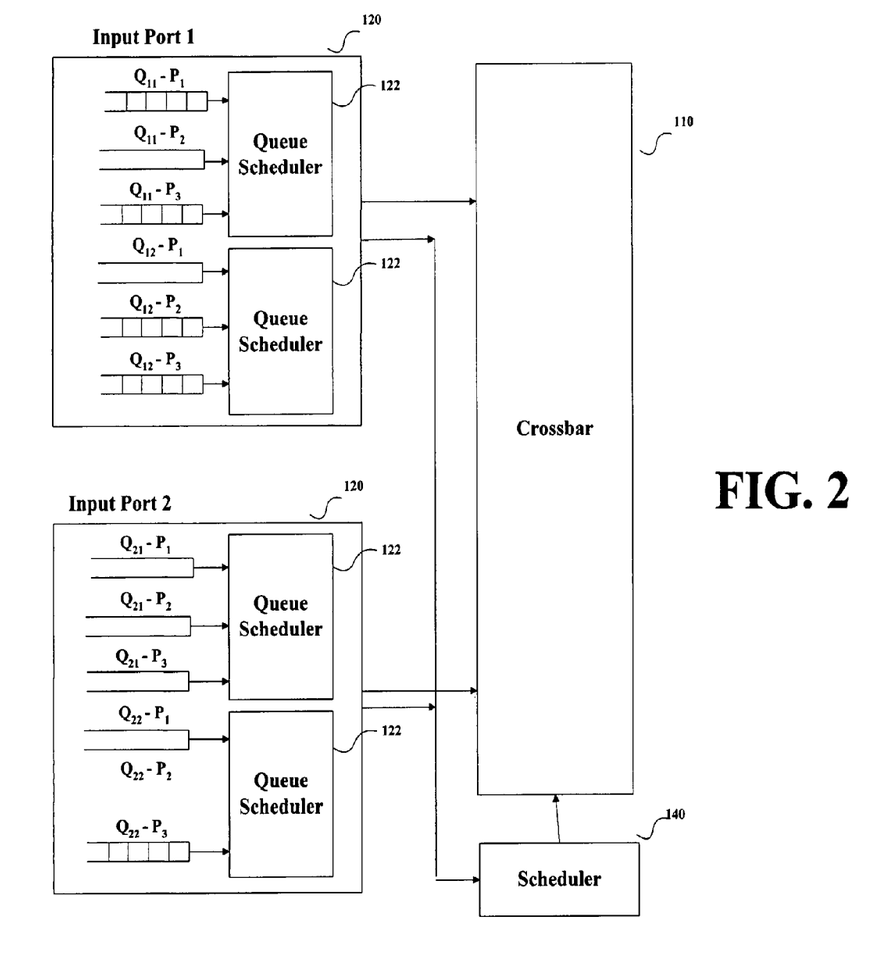
FIG. 2 depicts a system block diagram of a portion of a switch fabric, according to an embodiment of the invention.

FIG. 2 depicts a system block diagram of a portion of a switch fabric, according to an embodiment of the invention. As shown in FIG. 2, two input ports 120 (labeled "Input Port 1" and "Input Port 2") are coupled to crossbar 110 and scheduler 140. The example of the switch fabric portion shown in FIG. 2 has three different priority levels: $P_1$, $P_2$ and $P_3$, where for example $P_3 > P_2 > P_1$. Input ports 120 each are shown with queues associated with two output ports. For this system portion, input ports 120 each have six queues. More specifically, "Input Port 1" has six queues: $Q_{11}$-$P_1$, corresponding to destination output port 1, priority level 1; $Q_{11}$-$P_2$, corresponding to destination output port 1, priority level 2; $Q_{11}$-$P_3$, corresponding to destination output port 1, priority level 3; $Q_{12}$-$P_1$, corresponding to destination output port 2, priority level 1; and so on. Similarly, "Input Port 2" has six queues: $Q_{21}$-$P_1$, corresponding to destination output port 1, priority level 1; $Q_{21}$-$P_2$, corresponding to destination output port 1, priority level 2; $Q_{21}$-$P_3$, corresponding to destination output port 1, priority level 3; $Q_{22}$-$P_1$, corresponding to destination output port 2, priority level 1; and so on. This arrangement of three priority levels and six queues is for illustrative purposes, and other numbers of priority levels and queues are possible.

In this embodiment, each input port 120 further includes queue schedulers 122. More specifically, the queues for a given output port are uniquely associated with a queue scheduler 122. Following the example of FIG. 2, a queue scheduler 122 is coupled to the queues associated with input port 1 and output port 1: $Q_{11}$-$P_1$, $Q_{11}$-$P_2$ and $Q_{11}$-$P_3$; and another queue scheduler 122 is coupled to the queues associated with input port 1 and output port 2: $Q_{12}$-$P_1$, $Q_{12}$-$P_2$ and $Q_{12}$-$P_3$.

Queue schedulers 122 each select a packet from the head-of-line packets buffered at the associated queues. For example, where each queue $Q_{11}$-$P_1$, $Q_{11}$-$P_2$ and $Q_{11}P_3$ has at least one buffered packet, the associated queue scheduler 122 can select one packet from the three head-of-line packets (i.e., from the head-of-line packets for each of the three queues). Each queue scheduler 122 can perform such a selection based on, for example, round robin, priority-based or rate-based. Scheduling, as described in further detail below, can then be performed for these selected packets. In general, as packets are received at the input ports 120 and scheduled by scheduler 140, packets are subsequently forwarded to the appropriate output port 130 by the crossbar 110. Of course, packets received at different input ports 120 and destined for the same output port 130 can experience contention within the crossbar 110. Scheduler 140 resolves such contention, as discussed below, based on an arbitration (or scheduling) process.

When configured with a single priority level, each queue 121 is a virtual output queue (VOQ) uniquely associated with a specific output port 130. Thus, received packets (each designating a particular destination output port) are buffered in the appropriate VOQ for its destination output port. This embodiment is described in further detail below in reference to FIG. 3.

Figure 3:
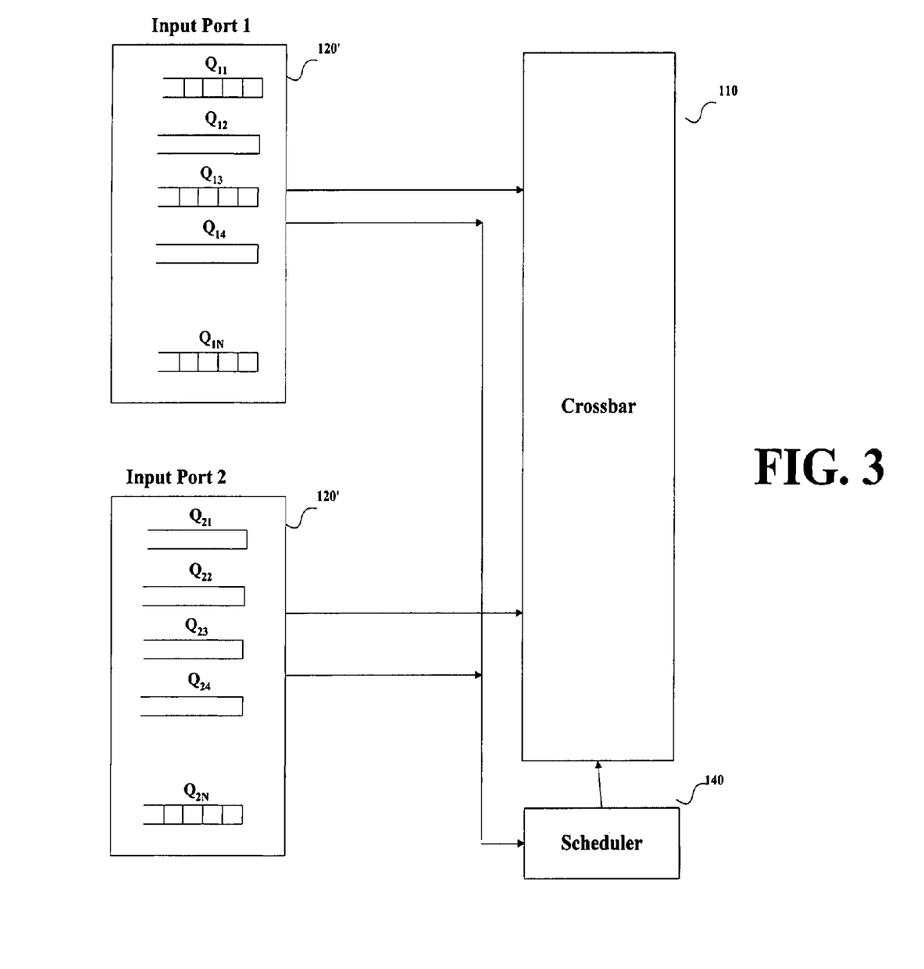
FIG. 3 depicts a system block diagram of a portion of a switch fabric, according to another embodiment of the invention.

FIG. 3 depicts a system block diagram of a portion of a switch fabric, according to another embodiment of the invention. As shown in FIG. 3, two input ports 120' (labeled "Input Port 1" and "Input Port 2") are coupled to crossbar 110 and scheduler 140. The example of the system portion shown in FIG. 2 can have any number of priority levels. Input ports 120' each are shown with queues associated with N number output ports. More specifically, "Input Port 1" has N queues: $Q_{11}$, corresponding to destination output port 1; $Q_{12}$, corresponding to destination output port 2; $Q_{13}$, corresponding to destination output port 3; and so on to $Q_{1N}$, corresponding to destination output port N. Similarly, "Input Port 2" has N queues: $Q_{21}$, corresponding to destination output port 1; $Q_{22}$, corresponding to destination output port 2; $Q_{23}$, corresponding to destination output port 3; and so on to $Q_{2N}$, corresponding to destination output port N. In this embodiment, scheduling, as described in further detail below, can then be performed for the head-of-line packet at each queue.

Returning to FIG. 1, scheduler 140 uses a parallel matching scheme that supports one or more different types of provisioning schemes such as priority provisioning and rate provisioning. Using such provisioning schemes, scheduler 140 is capable of supporting quality of service (QoS) in the network (to which switch fabric 100 is connected; not shown). In addition, scheduler 140 provides a high throughput in the switch fabric.

Note that input line cards (coupled to the switch fabric 100 but not shown in FIG. 1) can perform the scheduling and intra-port provisioning among all flows that are destined to the same output port. The switch fabric 100 can operate on a coarser granularity and can perform inter-port provisioning among all flows that are destined to the same output port.

Generally speaking, scheduler 140 performs three steps during the arbitration process: generating requests, generating grants and generating accepts. The grant and accept steps are carried out by the matching engine 142 of scheduler 140 according to the weight values associated with the packets priority level. To keep track of the priority levels of different packets, the weight matrix generator 141 of scheduler 140 assigns a weight value to every packet forming, for example, a service-weight matrix. Alternatively, the weight values can be represented by a set of vectors or any other type of structure that allows the origination input-port designation and destination output-port designation for each respective packet to be maintained in addition to the corresponding weight value.

The credit-weight vectors can be represented mathematically. More specifically, a credit-weight vector, i.e., $\underline{CI^i}(n) = (CI_1^i(n), \ldots, CI_N^i(n))$, can be assigned to input port i, and similarly, a credit-weight vector, i.e., $\underline{CO^j}(n) = (CO_1^j(n), \ldots, CO_N^j(n))$, can be assigned to output port j, where it is the time index. The kth entry (i.e., the kth credit-weight value), where $1 \leq k \leq N$, of every credit-weight vector corresponds to the kth link of the associated port.

The credit-weight values associated with the packets awaiting scheduling are updated by scheduler 140 according to the corresponding weight values of the packets and the last scheduling decision. In other words, for each time slot, the credit-weight value associated with every packet is increased by the corresponding weight value and decreased when the packet is served (i.e., when that packet is selected during the arbitration process so that a packet is scheduled for transit via the crossbar 110). Thus, the credit-weight value of a link indicates how much service is owed to that packet. Said another way, the credit-weight value indicates the extent to which a given packet is likely to be scheduled over other packets where that likelihood increases over time until the packet is serviced. The weight values of the packets can be predefined and/or can be adjusted during the operation of the switch fabric.

In addition, certain credit-weight values are updated based on a penalty. More specifically, the credit-weight values associated with non-backlogged queues are penalized during a given time slot. In other words, for a given port, any associated queues without a candidate packet (e.g., buffered at the associated virtual output queue) and having a credit-weight value greater than the credit-weight value of the packet selected during the arbitration process have their credit-weight values penalized. The credit-weight values of such packets can be, for example, decreased an amount related to the packet weight value.

The operation of scheduler 140 can also be represented mathematically. More specifically, consider input port i and output port j, and suppose that $CI_{max}^j(n)$ and $CO_{max}^j(n)$ are the maximum credit-weights selected in the accept and grant steps, respectively. The weight value for link (i,k) is $w_{ik}$, and $A_{ik}(n)$ is the serving indicator of that link, i.e., $$A_{ik}(n) = \begin{cases} 1 & \text{if } (i, k) \text{ is served} \\ 0 & \text{otherwise} \end{cases} \quad (1)$$

For link (i, k) and at input port i, the penalty for a non-backlogged, high-credit-weight-value link, $DI_k^i(n)$, is $$DI_k^i(n) = \begin{cases} 1 & \text{if } (i, k) \text{ is non-backlogged and } CI_k^i(n) \geq CI_{max}^i(n) \\ 0 & \text{otherwise} \end{cases} \quad (2)$$

$CO_{max}^j(n)$ is defined for output port j in a similar way. For link (j, k) and at output port j, the penalty for a non-backlogged, high-credit-weight-value link, $DO_k^j(n)$, is $$DO_k^j(n) = \begin{cases} 1 & \text{if } (j, k) \text{ is non-backlogged and } CO_k^j(n) \geq CO_{max}^j(n) \\ 0 & \text{otherwise} \end{cases} \quad (3)$$

Note that DI's and DO's specify the credit-weight values that are decremented to penalize the corresponding links. Hence, the credit-weight vector updating rule for the k-th element of input port i and output port j are, $$CI_k^i(n+1) = CI_k^i(n) + w_{ik}(n) - (DI_k^i(n) - (DI_k^i(n) + A_{ik}(n))$$

$$CO_k^j(n+1) = CO_k^j(n) + w_{ij}(n) - (DO_k^j(n) + A_{ij}(n)) \quad (4)$$

Penalizing advantageously limits a non-backlogged link from increasing unboundedly. Without penalization, a credit-weight value for a non-backlogged link could increase unboundedly. Then, when such a link receives a number of packets, the link would distract the service of the other links due to its very high credit-weight value. Moreover, the output pattern of such a scheduler would become very bursty. An alternative approach of reducing the credit-weight value to zero inappropriately introduces a delay on any low-weight links that are non-backlogged most of the time. Thus, the penalizing herein reduces the credit-weight value of a non-backlogged link, for example, by the link's service weight value.

In an alternative embodiment, the credit-weight values of the links within a credit-weight vector can be adjusted (either increased or decreased) (separate from the above-described credit-weight vector adjustment). The credit-weight vector can be so adjusted without affecting the overall performance of the scheduler because the provisioning method described herein is based on the relative differences between link credit-weight values, not on their absolute values.

In yet another embodiment, the credit-weight values can be maintained on a per priority-level basis. For example, in an example of the switch fabric having three different priority levels, $P_1$, $P_2$ and $P_3$, a separate credit-weight matrix or credit-weight vector(s) can be maintained for each priority level. Maintaining credit-weight values on a per priority-level basis can be used, for example, with the example of the switch portion shown in FIG. 2 where each input port has separate queues for each priority level. This allows the accumulation of credit-weight values for requests of different priority levels associated with the same input port.

Figure 4:
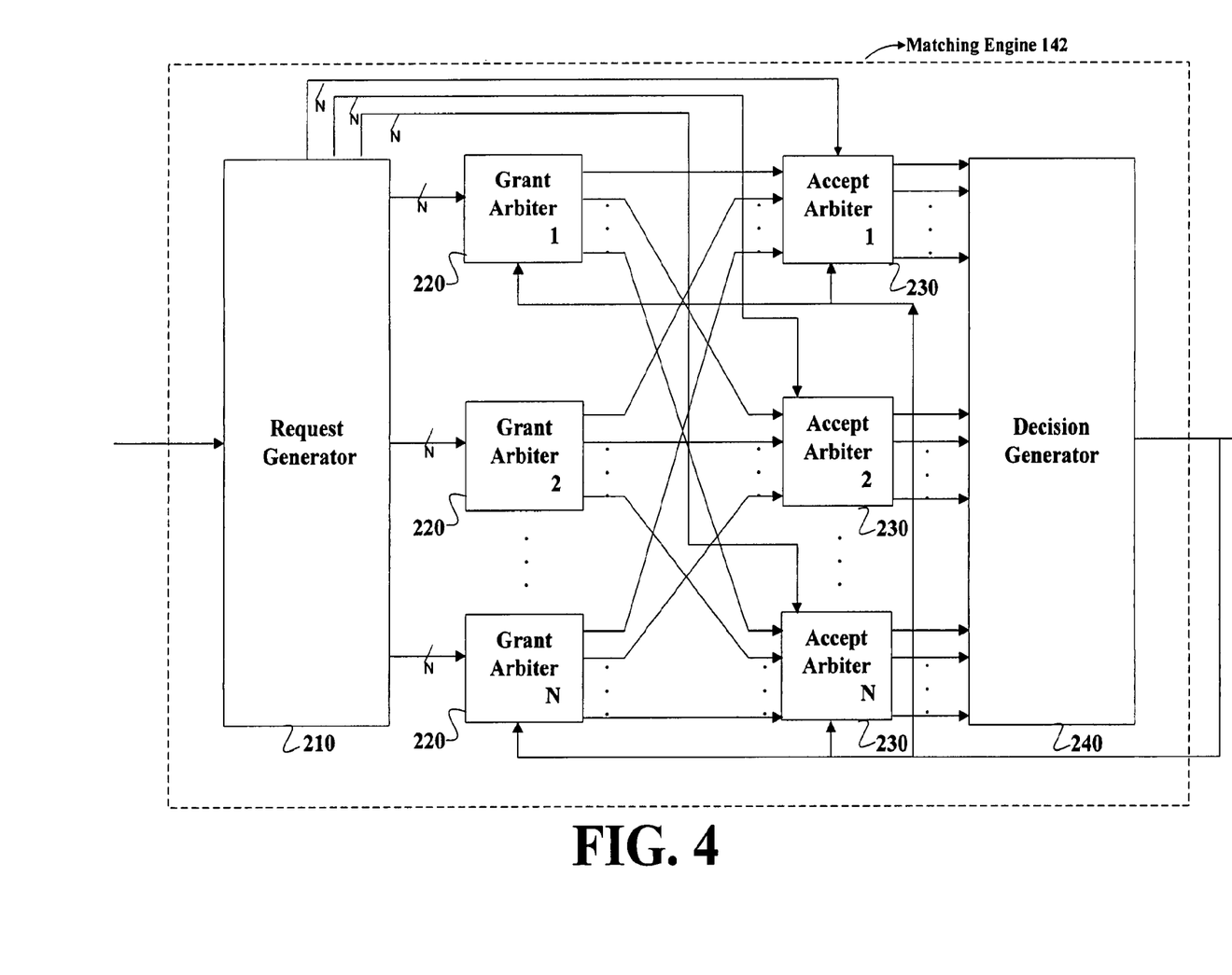
FIG. 4 shows a system block diagram of the matching engine of the scheduler shown in FIG. 1.

FIG. 4 shows a system block diagram of the matching engine of the scheduler shown in FIG. 1. As shown in FIG. 4, matching engine 142 of scheduler 140 includes request generator 210, grant arbiters 220, accept arbiters 230 and decision generator 240. Request generator 210 receives input signals from the input ports 120. Request generator 210 is connected to grant arbiters 220 and accept arbiters 230. A given grant arbiter 220 is connected to each accept arbiter 230. The accept arbiters 230 are connected to decision generator 240. Decision generator 240 provides output signals to crossbar 110 and provides feedback signals to grant arbiters 220 and accept arbiters 230.

Figure 5:
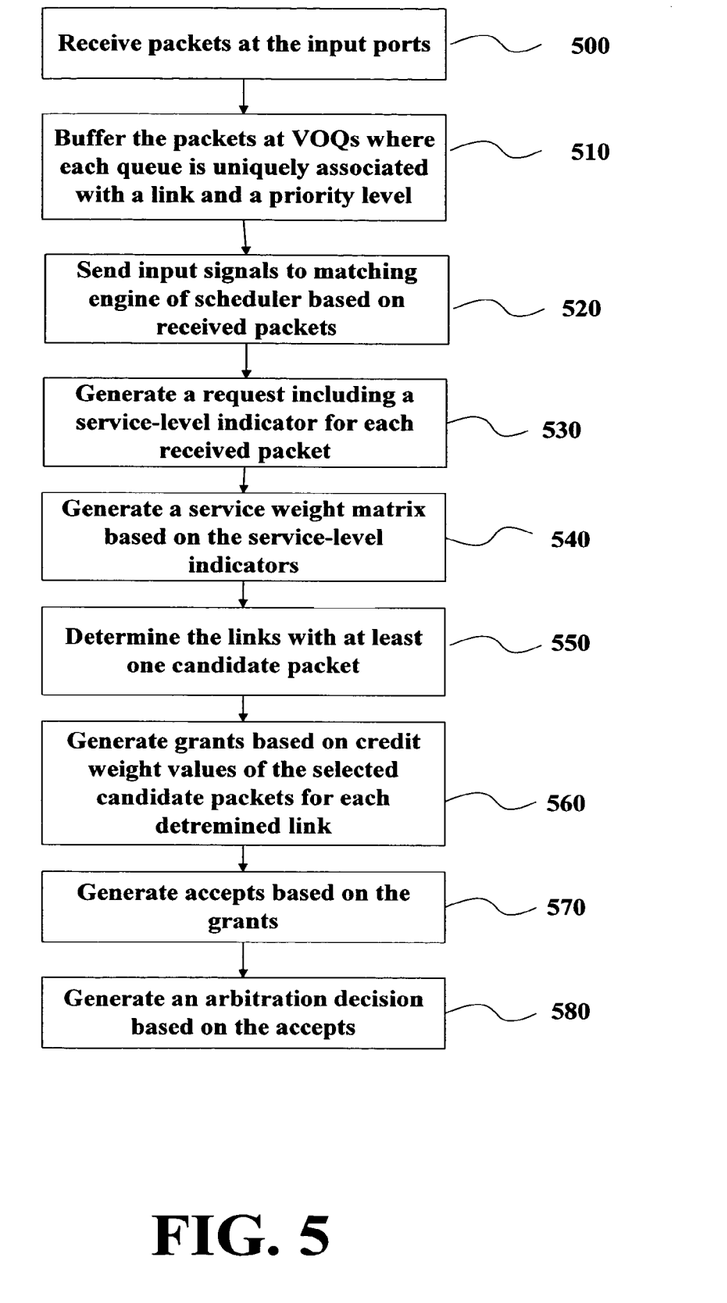
FIG. 5 shows a flowchart of an arbitration process, according to an embodiment of the invention.

FIG. 5 shows a flowchart of an arbitration process, according to an embodiment of the invention. At step 500, packets are received at input ports 120. At step 510, the packets are buffered at queues 121 where each queue is uniquely associated with a link and a priority level. In other words, at each input port 120, a queue can be established for each priority level for a given destination output port. FIG. 2 illustrates an example for a system having three different priority levels; each input port has three queues for each output port that can be connected to that input port via the crossbar.

Returning to FIG. 5, at step 520, request generator 210 receives input signal(s) based on each packet selected by a queue scheduler 122. At step 530, request generator 210 generates a request for each selected packet based on the received input signals. This request identifies, for example, the source input port 120, the destination output port 130 and a priority level for the corresponding packet. Thus, each request can include an input-port indicator, an output-port indicator and a service-level indicator, respectively, thereby representing a request to transit the crossbar 110. Accordingly, the requests generated by request generator 210 are provided to the appropriate grant arbiters 220.

Figure 6:
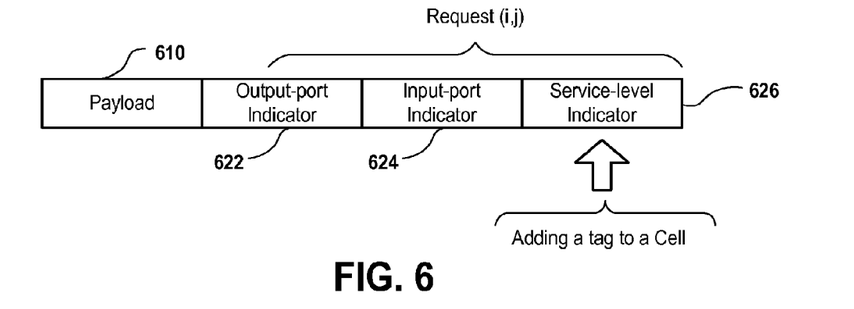
FIG. 6 depicts a diagram of a cell and its associated request, according to an embodiment of the invention.

FIG. 6 depicts a diagram of a cell and its associated request, according to an embodiment of the invention. A given cell associated with an input port, i, and an output port, j, includes a payload 610 and various header information that indicates, for example, its destination output port and priority level (or requested rate). As described above in connection with step 530, request (i,j) 620 is generated and includes input-port indicator 622, output-port indicator 624 and service-level indicator 626.

The requests generated by request generator 210 are provided to the appropriate grant arbiters 220. Returning to FIG. 5, at step 540, a service weight matrix is generated based on the service-level indictor of the requests. In other words, a weight value associated with each request (and associated with the corresponding packet) is generated while the origination input port and the destination output port are also maintained. The weight values can be generated according to a predefined set of guidelines and as a function of the service-level indicator. For example, in a system having four priority levels, each service-level indicator can have a value indicative of the four priority levels: when the service-level indicator has a binary value of "00" (indicative of priority level $P_1$), "01" (indicative of priority level $P_2$), "10" (indicative of priority level $P_3$) or "11" (indicative of priority level $P_4$); the associated weight value can be 0.1, 0.2, 0.3 and 0.4, respectively; or 0.1, 0.2, 0.3 and 1.0, respectively; or any other desired relationship between the priority levels and the weight values.

Figure 7:
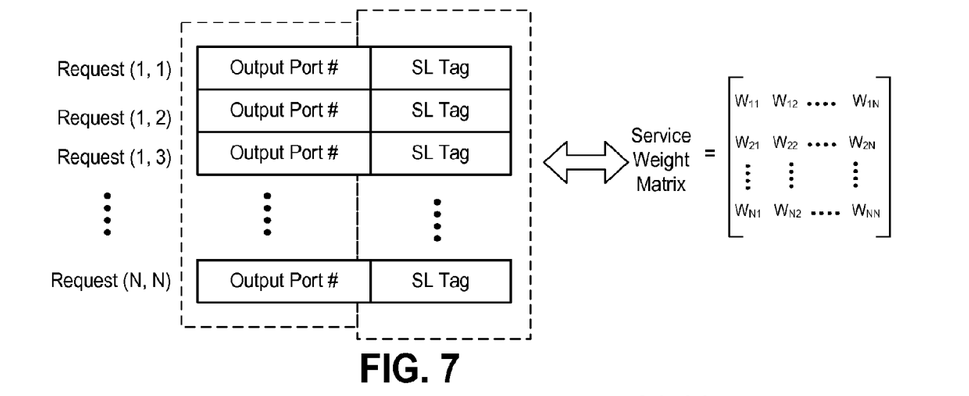
FIG. 7 depicts an example of a weight matrix based on a set of requests, according to an embodiment of the invention.

FIG. 7 depicts an example of a weight matrix based on a set of requests, according to an embodiment of the invention. As shown in FIG. 7, each request from the set of requests is uniquely associated with an origination input port and a destination output port. In other words, for each combination of an input port and an output port, a corresponding buffered packet will have a corresponding service-level indicator. For example, request (1,2) is associated with a packet buffered at input port 1 and destined for output port 2. For such a packet, the request (1,2) includes sn input-port indicator (not shown in FIG. 7), an output-port indicator and a service-level indicator. The service weight matrix can be generated based on the requests including the service-level indicators. Following the example of request (1,2), the weight matrix element $W_{1,2}$ has a weight value based on the service-level indicator.

Returning to FIG. 5, at step 550, grant arbiters 220 determine which links have an associated candidate packet based on the requests received from request generator 210. Although the term "candidate packet" is used in reference to data queued at the input port, the other types of data such as emits can be considered. A link is associated with a candidate packet when a packet is buffered at the input port for that link. In other words, request generator 210 generates a request(s) for each link associated with a buffered candidate packet(s). Thus, grant arbiters 220 can determine which links have an associated candidate packet, for example, by identifying for which input port 120 a request has been generated.

At step 560, grant arbiters 220 generate grants based on the requests received from request generator 210. Grant arbiters 220 can be configured on a per output-port basis or on a per input-port basis. In other words, step 560 can be performed on a per output-port basis or on a per input-port basis. For example, where the grants are determined on a per input-port basis the request associated with a particular input port 120 is sent to the corresponding grant arbiter 220. In such a configuration, requests from the first input port 120 are sent to the first grant arbiter 220; requests from the second input port 120 are sent to the second grant arbiter 220; and requests from the $n^{th}$ input port 120 are sent to the $n^{th}$ grant arbiter 220.

Alternatively, where grants are determined on a per output-port basis, the request associated with a particular output port 130 is sent to the corresponding grant arbiter 220. In such a configuration, a request that designates the first destination output port 130 is sent to the first grant arbiter 220; a request that designates the second output port 130 is sent to the second grant arbiter 220; and a request that designates the $n^{th}$ output port 130 is sent to the $n^{th}$ grant arbiter 220.

Grant arbiters 220 send an arbitration signal indicative of a grant to the appropriate accept arbiters 230. More specifically, a given grant arbiter 220 can receive a set of requests (i.e., as few as no requests or as many requests as there are associated links). In the case of a grant arbiter 220 that receives one or more requests, that grant arbiter 220 sends an arbitration signal indicative of a grant to the accept arbiter associated with that grant.

At step 570, accept arbiters 230 generate accepts based on the grants generated by grant arbiters 220. Accept arbiters 230 be configured on either a per input-port basis or a per output-port basis depending on the configuration of the grant arbiters 220. In other words, step 570 can be performed on a per input-port basis or on a per output-port basis. More specifically, if step 560 is performed on a per input-port basis by the grant arbiters 220, then step 570 is performed on a per output-port basis by accept arbiters 230. Similarly, if step 560 is performed on a per output-port basis by grant arbiters 220, then step 570 is performed on a per input-port basis by accept arbiters 230. Once the accepts are generated by accept arbiters 230, arbitration signals indicating the accepts are provided to the decision generator 240.

At step 580, decision generator 240 generates an arbitration decision for a given time slot based on the accepts generated by the accept arbiters 230 and provides a signal indicative of the arbitration results for the given time slot to crossbar switch 110. In addition, the signal indicative of the arbitration results is also sent from decision generator 240 to the grant arbiters 220 and accept arbiters 230 so that the weight values can be updated. Credit-weight values are updated based on which requests were winners in the arbitration process. In addition, certain credit-weight values can be penalized based on this feedback information from decision generator 240. Credit-weight values are penalized for links having a credit-weight value higher than the link selected but not having a candidate packet buffered at their associated queues. Said another way, in the cases where a link with a higher credit-weight value than the selected link but no buffered candidate packet (awaiting switching across the crossbar 110), then that link can be accordingly penalized and its credit-weight value reduced.

Figure 8:
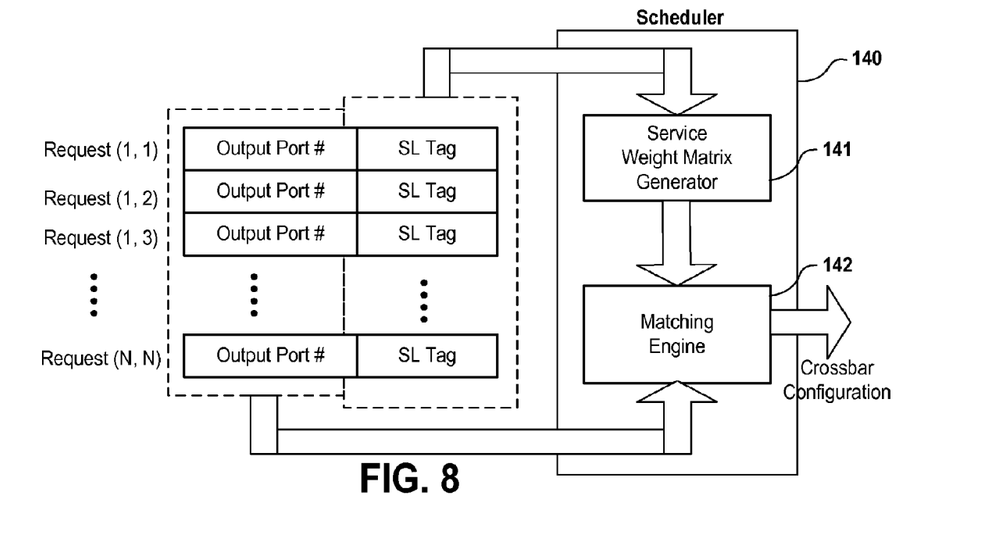
FIG. 8 depicts a diagrammatic example of a set of requests as used by the scheduler of FIG. 1.

Note that although the arbitration process has been described in connection with FIG. 5 for a given time slot, arbitration can be performed multiple times iteratively within a given time slot. In such an embodiment, for example, arbitration winners from prior iterations within a given time slot are removed from consideration and additional iterations of arbitration is performed for the arbitration losers to thereby provide more arbitration winners within a given time slot FIG. 8 depicts a diagrammatic example of a set of requests as used by the scheduler of FIG. 1. As shown in FIG. 8, each request from the set of requests (1,1) through (N,N) is uniquely associated with an origination input port and a destination output port, and is associated with a service level indicator. As described above in reference to FIG. 7 and step 540 of FIG. 5, this request information is provided to the weight matrix generator 141 to produce a service weight matrix. At least a portion of this request information is also provided to the matching engine 142, which performs arbitration using the weight matrix. More specifically, matching engine 142 performs arbitration based on the input-port indicator and the output-port indicator of each request and the service weight matrix as described above in reference to steps 550 through 580.

CONCLUSION

While various embodiments of the invention have been described above, it should be understood that they have been presented by way of example only, and not limitation. Thus, the breadth and scope of the invention should not be limited by any of the above-described embodiments, but should be defined only in accordance with the following claims and their equivalents.

The previous description of the embodiments is provided to enable any person skilled in the art to make or use the invention. While the invention has been particularly shown and described with reference to embodiments thereof, it will be understood by those skilled in the art that various changes in form and details may be made therein without departing from the spirit and scope of the invention.

What is claimed is:

1. A method for arbitrating for a switch fabric having a plurality of ports, each port from the plurality of ports having its own plurality of links within a crossbar, comprising:

determining, on a per port basis, a subset of links from the plurality of links associated with that port, each link from the determined subset of links for that port being associated with at least one candidate packet;

selecting, on a per port basis, a candidate packet for each link from the determined subset of links based on a credit-weight value of the each link and based on a service-weight value associated with each candidate packet for that link; and selecting, on a per port basis, a link from the determined subset of links for that port based on the credit-weight values and a weight value associated with a service level indicator of the selected candidate packet for that each link from the determined subset of links for that port.

2. The method of claim 1, wherein, for each determined link associated with that port, the credit-weight value associated with the selected candidate packet is greater than the credit-weight values associated with remaining candidate packets.

3. The method of claim 1, wherein the credit-weight value associated with the selected candidate packet for the selected link for that port is greater than the credit-weight value associated with selected candidate packet for the remaining determined links for that port.

4. The method of claim 1, wherein each port is uniquely associated with its own plurality of queues, each queue from the plurality of queues for a first port being uniquely associated with a combination of a credit-weight value and a link from the plurality of links for the first port.

5. The method of claim 1, wherein the determining, the selecting the candidate packet, and the selecting the link are performed on a per output port basis.

6. The method of claim 5, further comprising:

receiving, on a per output port basis, a plurality of requests associated with that port, each request from the plurality of requests associated with that port being associated with a link from the plurality of links associated with that port and being associated with a candidate packet having its own associated weight value; and sending, on a per output port basis, a grant associated with the selected link for that output port.

7. The method of claim 6, further comprising:

determining, on a per input port basis, a subset of links from a plurality of links associated with that input port based on any grants received at that input port; and selecting, on a per input port basis, at most one link from the determined subset of links associated with that input port and being associated with a selected candidate packet associated with a credit-weight value greater than a credit-weight value associated with each remaining candidate packet associated with the determined subset of links for that input port.

8. The method of claim 1, wherein the determining, the selecting the candidate packet, and the selecting the link are performed on a per input port basis.

9. The method of claim 8, further comprising:

receiving, on a per input port basis, a plurality of requests associated with that port, each request from the plurality of requests associated with that port being associated with a link from the plurality of links associated with that port and being associated with a candidate packet having its own associated service-weight value; and sending, on a per input port basis, a grant associated with the selected link for that input port.

10. The method of claim 9, further comprising:
  determining, on a per output port basis, a subset of links from a plurality of links associated with that output port based on any grants received at that output port; and
  selecting, on a per output port basis, at most one link from the determined subset of links associated with that output port being associated with a selected candidate packet associated with a credit-weight value greater than a credit-weight value associated with each remaining candidate packet associated with the determined subset of links for that output port.

11. A method for arbitrating for a switch fabric having a plurality of ports, each port from the plurality of ports having its own plurality of links within a crossbar, comprising:
  determining, on a per port basis, a subset of links from the plurality of links associated with that port, each link from the determined subset of links for that port being associated with at least one candidate packet;
  selecting, on a per port basis, a candidate packet for each link from the determined subset of links based on a credit-weight value of the each link and based on a service-weight value associated with each candidate packet for that link; and
  selecting, on a per port basis, a link from the determined subset of links for that port based on the credit-weight value and a weight value associated with a service level indicator of the selected candidate packet for that each link from the determined subset of links for that port, wherein the determining, the selecting the candidate packet, and the selecting the link are performed on one of a per output port basis or a per input port basis.

12. The method of claim 11, wherein, for each determined link associated with that port, the credit-weight value associated with the selected candidate packet is greater than the credit-weight values associated with remaining candidate packets.

13. The method of claim 11, wherein the credit-weight value associated with the selected candidate packet for the selected link for that port is greater than the credit-weight value associated with selected candidate packet for the remaining determined links for that port.

14. The method of claim 11, wherein each port is uniquely associated with its own plurality of queues, each queue from the plurality of queues for a first port being uniquely associated with a combination of a credit-weight value and a link from the plurality of links for the first port.

15. The method of claim 11, further comprising:
  receiving, on a per output port basis, a plurality of requests associated with that port, each request from the plurality of requests associated with that port being associated with a link from the plurality of links associated with that port and being associated with a candidate packet having its own associated weight value; and sending, on a per output port basis, a grant associated with the selected link for that output port.

16. The method of claim 15, further comprising:
  determining, on a per input port basis, a subset of links from a plurality of links associated with that input port based on any grants received at that input port; and
  selecting, on a per input port basis, at most one link from the determined subset of links associated with that input port and being associated with a selected candidate packet associated with a credit-weight value greater than a credit-weight value associated with each remaining candidate packet associated with the determined subset of links for that input port.

17. The method of claim 11, further comprising:
  receiving, on a per input port basis, a plurality of requests associated with that port, each request from the plurality of requests associated with that port being associated with a link from the plurality of links associated with that port and being associated with a candidate packet having its own associated service-weight value; and
  sending, on a per input port basis, a grant associated with the selected link for that input port.

18. The method of claim 17, further comprising:
  determining, on a per output port basis, a subset of links from a plurality of links associated with that output port based on any grants received at that output port; and
  selecting, on a per output port basis, at most one link from the determined subset of links associated with that output port being associated with a selected candidate packet associated with a credit-weight value greater than a credit-weight value associated with each remaining candidate packet associated with the determined subset of links for that output port.

* * * * *